Aug. 13, 1946.　　　W. S. SIMMIE　　　2,405,761
ELECTROMAGNETIC VIBRATOR
Filed Oct. 30, 1944
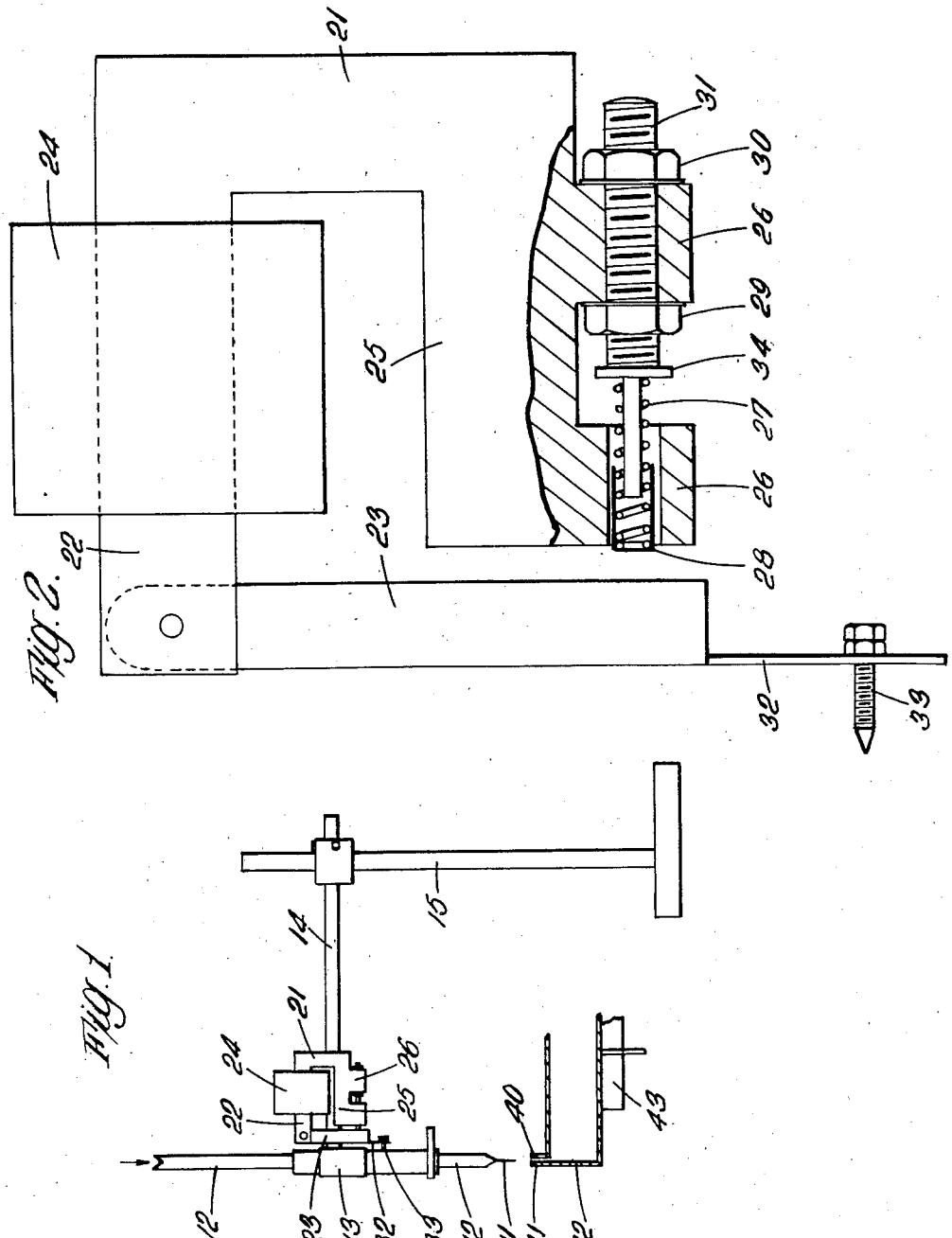
INVENTOR.
WALTER STEWART SIMMIE
BY [signature]
ATTORNEY Patented Aug. 13, 1946

2,405,761

UNITED STATES PATENT OFFICE 2,405,761

ELECTROMAGNETIC VIBRATOR

Walter Stewart Simmie, Headington, Oxford, England

Application October 30, 1944, Serial No. 561,106
In Great Britain November 11, 1943

1 Claim. (Cl. 314—39)

In order to improve methods of arc welding it is desirable to eliminate as far as possible the human element and to control automatically all the conditions leading to the best product such, for example, as the value of the welding current, length of arc, angle of electrode in respect to the work (which may be variable), rate of movement of the electrode along the joint to be welded and of course, linked with the second item will be the rate of feed of the electrode to the electrode holder. By a proper adjustment of one or all of these conditions it is possible to achieve good and uniform penetration of the weld metal into the joint without undercutting and without wasting weld metal. As the electrode is moved along the joint to be welded it may be found desirable to change one or more of the conditions such, for example, as the slope of the electrode with respect to the work.

Today there are machines on the market for arc welding which might properly be termed semi-automatic arc welding machines in that they control the rate of feed of the electrode to the work and the length of the arc. Peculiar conditions are sometimes met with such, for example, as the blowing or extinguishing of the arc which is likely to create a crater in the work or otherwise spoil a satisfactory welded joint and such a condition, of course, requires that the arc shall be restruck and the welding continued.

The object of this invention is to provide a device for use with a manually operated or semi-automatic arc welding machine which will obviate the tendency of the arc to be extinguished and according to the invention there is provided, in association with the electrode holder, a vibrator which imparts to the electrode a slight vibratory motion which motion obviates the tendency of the arc to fail. The vibrator may consist simply of an electrically operated coil and armature coupled with the electrode holder. Means are provided to adjust the degree of vibratory movement of the armature and its connection with the electrode holder.

It is found in using semi-automatic arc welding equipment that when the arc is struck some means must be provided for lifting the electrode from the work as fusion may take place between the work and the electrode. By use of the vibrator of this invention the welding machine contactor or control device is not closed until the vibrator is set in motion. It will be found that the arc is readily started up and maintained solely by use of the vibrator in connection with the automatic feed of the welding electrode or wire.

An unskilled operator may maintain the arc in one position for a period of time sufficient to blow a hole in the molten pool of metal. The vibrator eliminates this danger by ensuring that the arc is continually oscillated between the pool of molten metal and the adjacent cold metal, thus maintaining the flow of the molten metal and preheating the metal in the immediate vicinity of the weld.

Experiments have shown that by supplying this vibratory motion to the electrode the tendency of the arc to fail particularly when starting is almost completely eliminated.

The invention is illustrated in the accompanying drawing of which Figure 1 is a diagrammatic representation of the device and Figure 2 is an enlarged view partly in section of a detail.

The welding rod or wire 11 is shown within its insulated covering 12, held in a bracket or holder 13, which holder is pivotally mounted on an arm 14 secured adjustably in a stand 15. The feed of the wire or rod through the holder 13 is effected in any well known manner.

Mounted on the arm 14 is the vibrator proper; this consists of a U-shaped core 21, to the upper limb 22 of which is pivotally connected an armature 23. The core is magnetised by an alternating current supply to the coil 24 carried by the limb 22. Thus when current flows the armature 23 is attracted to the lower limb 25 of the core 21. Formed integrally with or attached to the limb 25 is a depending housing 26 in which is carried a coiled spring 27 at one end of which is a non-magnetic cap or plunger 28 arranged to bear against the armature 23, whilst the other end bears against a washer 34 secured on a bolt 31 screwed into said housing, and adjusted therein by means of the nuts 29 and 30. By adjustment of the nuts 29 and 30 the resilient thrust of the plunger 28 against the armature 23 can be varied as desired.

The armature 23 itself carries at its lower end, or on an extension piece 32 secured to its lower end, an adjusting screw 33, which bears against the insulated covering 12 of the welding rod 11.

The welding rod holder may be mounted with a spring bias towards the armature, so that it tends to move constantly into engagement therewith.

When the exciting coil 24 is energised, from an alternating current supply, the core is magnetised and pulls the armature 23 towards the limb 25. The armature comes against the non-magnetic spring pressed plunger 28 and on reversal of the polarity of the supply is thrust by the spring 27 away from the limb 25. The screw 33 therefore thrusts the welding rod in the same direction. It will be clear that the armature is repeatedly attracted to, and repelled from, the limb 25 of the core 21 and consequently the welding rod is given a vibratory motion, which as described, will have a periodicity equal to that of the source of supply.

The degree of movement of the welding rod may be varied by four factors viz: (a) the length of the armature 23 (or its extension piece 32), (b) the provision or not of spring bias of the rod holder towards the armature, (c) the adjustment provided by the adjusting nuts 29 and 30 and (d) the adjustment provided by the adjusting screw 33. By proper variation of one or more or all of these factors the appropriate degree of vibration may be ensured.

The welding rod is shown in the drawing as arranged to weld the upturned adjacent flanges 40 and 41 of, for example, an enclosed shallow cylinder 42. The work is mounted on a rotatable table 43.

In use, the welding rod is adjusted to be within striking distance of the work. The vibrator is set in motion followed by rotation of the table 43 and finally the welding currrent is switched on; the arc is struck and due to the motion of the welding rod, will not fail until the current is again switched off.

I claim:

Electromagnetic vibrator, particularly for use in connection with welding electrodes, comprising a U-shaped core, a coil for energizing said core, an armature pivoted to one leg of said core, a non-magnetic spring pressed plunger housed within the other leg of said core and adapted to bear against said armature once it is attracted by said other leg of the core, on energization of said coil, means for adjusting the spring tension on said plunger, a vibration transfer means mounted on said armature at a right angle thereto whereby to vibrate transversely a welding electrode extending parallel to said armature, and means for adjusting said vibration transfer means to vary the transverse thrust of the armature against the welding electrode.

WALTER STEWART SIMMIE.